(12) United States Patent
Teng et al.

(10) Patent No.: US 9,051,900 B2
(45) Date of Patent: Jun. 9, 2015

(54) EJECTOR TYPE EGR MIXER

(75) Inventors: Ho Teng, Canton, MI (US); Gerhard Regner, San Diego, CA (US)

(73) Assignee: AVL Powertrain Engineering, Inc., Plymouth, MI (US)

( * ) Notice: Subject to any disclaimer, the term of this patent is extended or adjusted under 35 U.S.C. 154(b) by 851 days.

(21) Appl. No.: 13/143,561

(22) PCT Filed: Jan. 12, 2010

(86) PCT No.: PCT/US2010/020732
§ 371 (c)(1),
(2), (4) Date: Jul. 7, 2011

(87) PCT Pub. No.: WO2010/083151
PCT Pub. Date: Jul. 22, 2010

(65) Prior Publication Data
US 2011/0265772 A1    Nov. 3, 2011

Related U.S. Application Data

(60) Provisional application No. 61/144,241, filed on Jan. 13, 2009.

(51) Int. Cl.
*F02M 25/07* (2006.01)
*F02B 31/04* (2006.01)
(Continued)

(52) U.S. Cl.
CPC ............ *F02M 25/0707* (2013.01); *F02B 31/04* (2013.01); *F02M 25/0722* (2013.01); *F02M 29/06* (2013.01); *F02M 35/10118* (2013.01); *F02M 35/10222* (2013.01); *F02M 35/10262* (2013.01); *F02M 35/112* (2013.01); *Y02T 10/121* (2013.01); *Y02T 10/146* (2013.01)

(58) Field of Classification Search
CPC .......... F02M 25/0722; F02M 25/0713; F02M 25/0724; F02M 35/10222; Y02T 10/121
USPC ............. 123/568.11, 568.18, 568.17, 568.12, 123/590, 592; 60/605.1, 605.2
See application file for complete search history.

(56) References Cited

U.S. PATENT DOCUMENTS 3,768,260 A  * 10/1973  Glenn ............................. 60/323
4,021,677 A    5/1977  Rosen et al.
(Continued)

FOREIGN PATENT DOCUMENTS

JP         2008143522        6/2008
WO        03033881 A1         4/2003

*Primary Examiner* — Hai Huynh
*Assistant Examiner* — Gonzalo Laguarda
(74) *Attorney, Agent, or Firm* — Harness, Dickey & Pierce, P.L.C.

(57) ABSTRACT

A radial-mixing exhaust gas recirculation mixer is disclosed having an air supply passage having a convergent portion. An exhaust gas recirculation passage within the convergent portion includes a nozzle having a terminal end. A mixing tube is arranged downstream from the air supply passage and at least a portion of the exhaust gas recirculation passage. A mixing element is disposed in the mixing tube. In one example, a divergent portion is arranged downstream adjoining the mixing tube to increase the pressure of the mixture after the mixing tube. In one example, the exhaust gas recirculation mixer is arranged within an engine such that the air supply passage is in fluid communication with an intake manifold. The exhaust gas recirculation passage is in fluid communication with an exhaust manifold to recirculate a portion of exhaust gas to the intake manifold.

15 Claims, 3 Drawing Sheets

(51) Int. Cl.
*F02M 29/06* (2006.01)
*F02M 35/10* (2006.01)
*F02M 35/112* (2006.01)

(56) References Cited

U.S. PATENT DOCUMENTS

| | | | |
|---|---|---|---|
| 4,106,287 A * | 8/1978 | Auclair et al. | 60/274 |
| 4,300,353 A | 11/1981 | Ridgway | |
| 4,370,304 A * | 1/1983 | Hendriks et al. | 422/224 |
| 4,718,393 A * | 1/1988 | Bakish | 123/593 |
| 4,901,531 A | 2/1990 | Kubo et al. | |
| 4,996,845 A | 3/1991 | Kim | |
| 5,000,003 A | 3/1991 | Wicks | |
| 5,121,607 A | 6/1992 | George, Jr. | |
| 5,322,222 A | 6/1994 | Lott | |
| 5,327,987 A | 7/1994 | Abdelmalek | |
| 5,385,211 A | 1/1995 | Carroll | |
| 5,611,203 A | 3/1997 | Henderson et al. | |
| 5,680,764 A | 10/1997 | Viteri | |
| 6,044,827 A * | 4/2000 | Pfaff et al. | 123/568.18 |
| 6,247,316 B1 | 6/2001 | Viteri | |
| 6,425,356 B1 * | 7/2002 | Pischinger et al. | 123/90.15 |
| 6,450,283 B1 | 9/2002 | Taggett | |
| 6,467,270 B2 | 10/2002 | Mulloy et al. | |
| 6,502,397 B1 * | 1/2003 | Lundqvist | 60/605.2 |
| 6,523,349 B2 | 2/2003 | Viteri | |
| 6,732,524 B2 * | 5/2004 | Sponton | 60/605.2 |
| 6,886,544 B1 * | 5/2005 | Bui | 123/568.18 |
| 6,945,029 B2 | 9/2005 | Viteri | |
| 7,032,578 B2 * | 4/2006 | Liu et al. | 123/568.15 |
| 7,040,305 B2 * | 5/2006 | Sponton | 123/568.18 |
| 7,056,251 B2 | 6/2006 | Ibaraki | |
| 7,076,952 B1 | 7/2006 | Vetrovec | |
| 7,111,975 B2 | 9/2006 | Fenton et al. | |
| 7,181,919 B2 | 2/2007 | Uno et al. | |
| 7,353,811 B2 * | 4/2008 | Weisz | 123/568.17 |
| 7,454,910 B2 | 11/2008 | Hamada et al. | |
| 7,454,912 B2 | 11/2008 | Yamanaka et al. | |
| 7,475,541 B2 | 1/2009 | Ibaraki et al. | |
| 7,531,912 B2 | 5/2009 | Tamura et al. | |
| 7,547,002 B2 * | 6/2009 | Mao et al. | 261/78.1 |
| 7,628,144 B2 | 12/2009 | Vetrovec | |
| 7,798,135 B2 * | 9/2010 | Bischofberger et al. | 123/568.18 |
| 7,814,745 B2 * | 10/2010 | Levin et al. | 60/286 |
| 7,854,118 B2 * | 12/2010 | Vetrovec | 60/605.1 |
| 8,033,714 B2 * | 10/2011 | Nishioka et al. | 366/163.2 |
| 2004/0187506 A1 | 9/2004 | Iwanami et al. | |
| 2004/0255586 A1 | 12/2004 | Hamada et al. | |
| 2005/0228553 A1 | 10/2005 | Tryon | |
| 2006/0124116 A1 * | 6/2006 | Bui | 123/568.18 |
| 2006/0201154 A1 | 9/2006 | Kato et al. | |
| 2007/0126236 A1 | 6/2007 | Tamura et al. | |
| 2007/0245737 A1 | 10/2007 | Inaba et al. | |
| 2007/0295737 A1 | 12/2007 | Del Val Catala | |
| 2008/0021628 A1 | 1/2008 | Tryon | |
| 2008/0027639 A1 | 1/2008 | Tryon | |
| 2008/0051977 A1 | 2/2008 | Tryon | |
| 2008/0110171 A1 | 5/2008 | Schmeltz | |

* cited by examiner

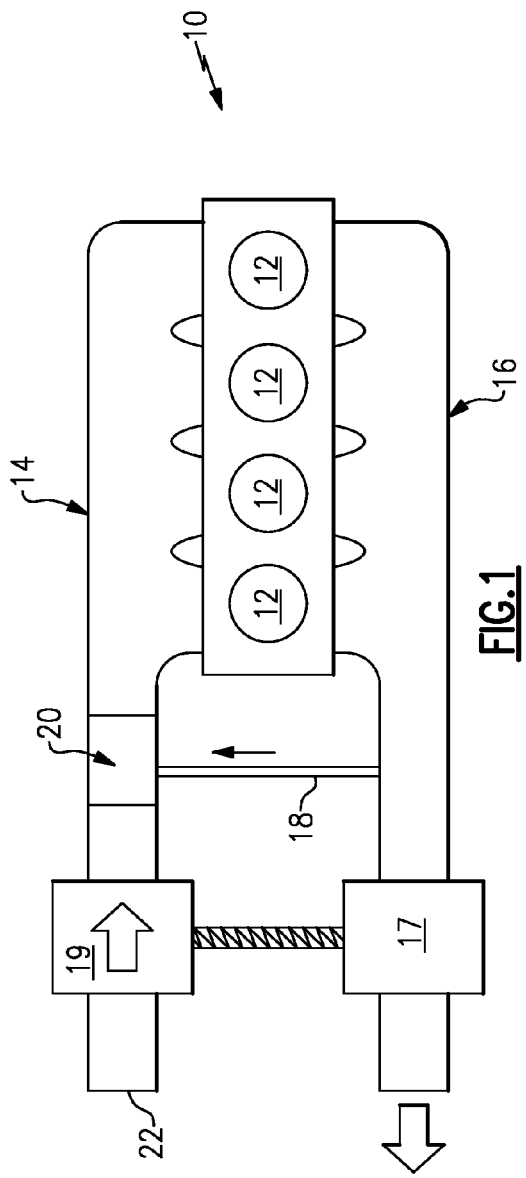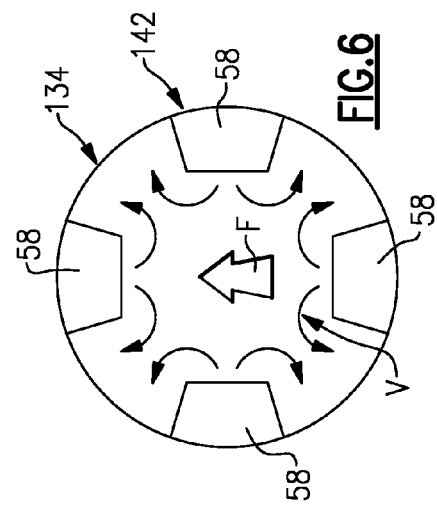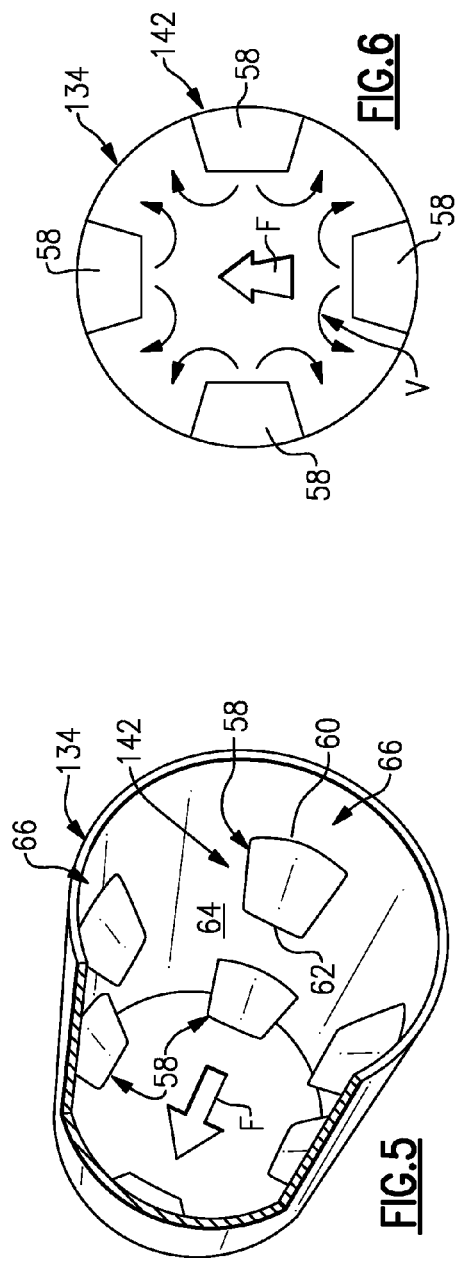

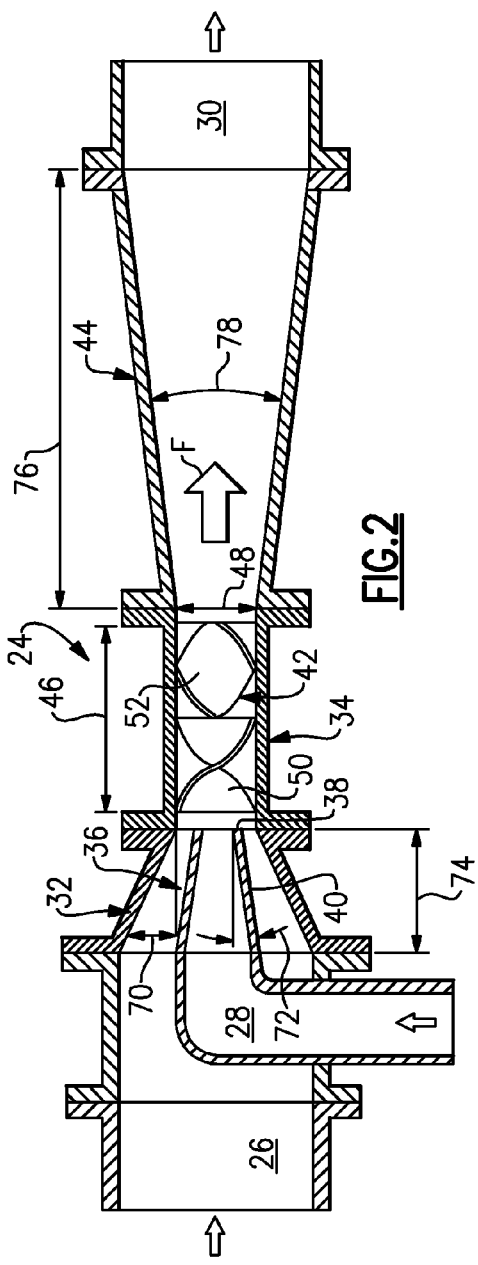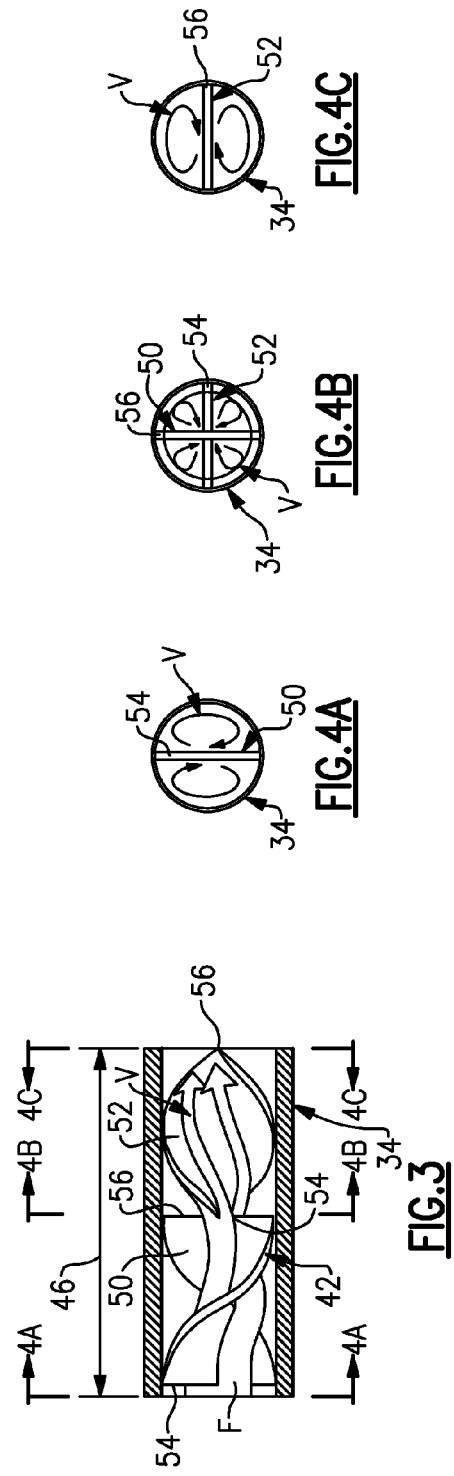

EJECTOR TYPE EGR MIXER

This application claims priority to U.S. Provisional Application No. 61/144,241, which was filed on Jan. 13, 2009.

BACKGROUND

This disclosure relates to an ejector-type exhaust gas recirculation (EGR) mixer for use with a diesel engine, for example.

EGR has been demonstrated to be an effective method for reducing NOx emissions from diesel and gasoline engines. For the turbo-charge direct injection gasoline engine, EGR is also often needed for controlling the engine knocking. EGR and air are mixed in an EGR mixer before the charge enters the engine cylinders.

The conventional EGR mixers are axial mixers, where the EGR introduced into the mixer is in co-flow with air along the axis of the mixer and the mixing is based on diffusion and/or dispersion. Venturi-type EGR mixers and multi-hole co-flow EGR mixers are all axial mixers. For these type mixers, the required mixing length L is generally longer than ten times of the mixing section diameter d (i.e., L/d>10) to achieve an acceptable mixing quality. Long mixing lengths are difficult to package for most applications.

SUMMARY

A radial-mixing exhaust gas recirculation mixer is disclosed having an air supply passage having a convergent portion. An exhaust gas recirculation passage within the convergent portion includes a nozzle having a terminal end. A mixing tube is arranged downstream from the air supply passage and at least a portion of the exhaust gas recirculation passage. A mixing element is disposed in the mixing tube. In one example, a divergent portion is arranged downstream adjoining the mixing tube to increase the pressure of the mixture after the mixing tube. In one example, the exhaust gas recirculation mixer is arranged within an engine such that the air supply passage is in fluid communication with an air compressor. The exhaust gas recirculation passage is in fluid communication with an exhaust manifold to recirculate a portion of exhaust gas to the intake manifold.

BRIEF DESCRIPTION OF THE DRAWINGS

The disclosure can be further understood by reference to the following detailed description when considered in connection with the accompanying drawings wherein:

FIG. 1 is a highly schematic view of an engine.

FIG. 2 is a cross-sectional view of an example EGR mixer.

FIG. 3 is an enlarged cross-sectional view of a portion of the EGR mixer of FIG. 2 illustrating flow through a mixing element.

FIGS. 4A-4C are cross-sectional views taken along lines 4A-4A, 4B-4B and 4C-4C respectively of FIG. 3.

FIG. 5 is a partially broken perspective view of another example EGR mixer.

FIG. 6 is a schematic end view of the EGR mixer shown in FIG. 5.

DETAILED DESCRIPTION

Figure 7:
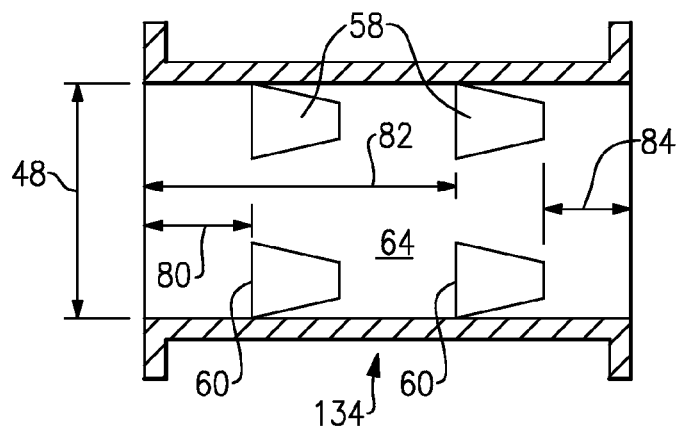
FIG. 7 is a cross-sectional view of the mixing element shown in FIG. 5.

An engine 10 is illustrated in FIG. 1 in a highly schematic fashion. The engine 10 typically includes many other components that are not illustrated, which contribute to the overall efficiency of the engine. In one example, the engine is a diesel engine with a turbocharger. It should be understood that the disclosed embodiments can apply to other configurations and other engines, such as gasoline engines.

The engine 10 includes cylinders 12 are supplied air through an intake manifold 14. Exhaust gases are expelled from the cylinders 12 through an exhaust manifold 16. An EGR passage 18 circulates a portion of exhaust gases from the exhaust manifold 16 to the air supply passage where it is intermixed in a mixing region 20. In one example, a compressor 19 is arranged between and inlet 22 and the intake manifold 14 to pressurize air entering the cylinders 12. The compressor 19 is driven by a turbine 17 rotated by exhaust gases from the exhaust manifold 16, for example.

To reduce undesired emissions of the engine 10, it is desirable to mix the EGR thoroughly with the air before entering the combustion chambers of the engine 10. An example EGR mixer 24 is illustrated in FIG. 2 and is arranged in the mixing region 20 of FIG. 1. The EGR mixer 24 includes an air passage 26 that receives air from the compressor 19 and an EGR passage 28 that receives the EGR from the exhaust manifold 16 via the EGR passage 18. The air and EGR flow F intermix with one another and exit through a mixed gas passage 30, which supplies the mixture of air and EGR to the cylinders 12. In the example shown, the air passage 26 includes a convergent portion 32 adjoining a mixing tube 34. In one example, the convergent portion 32 is tapered at an angle 70 approximately 30°-40°. The EGR passage 28 is disposed within the air passage 26 and includes a nozzle 40 with a terminal end 38. In one example, the nozzle 40 is tapered at an angle 72 approximately 3°-5°. In the example, the nozzle 40 is concentric with the convergent portion 32, thus providing an annulus 36 about the EGR passage 28. In the example, the terminal end 38 is approximately axially aligned with where the convergent portion 32 joins the mixing tube 34. A divergent portion 44 is arranged downstream from and adjoining the mixing tube 34 to recover the pressure losses created by the mixing tube 34. The divergent portion 44 may have an angle 78 of approximately 10°-15°.

The mixing tube 34 has a length 46 and a diameter 48. In one example, the convergent portion 32 has a length 74 approximately 1.5 times the diameter 48, and the divergent portion 44 has a length 76 approximately 3 to 4 times the diameter 48. The divergent portion 44 increases the pressure of mixture after the mixing tube 34 like an ejector. In one example, the diameter 48 is less than approximately ⅓ the length 46 and, for example, 2 times the length 46. A mixing element 42 is arranged within the mixing tube 34 to encourage homogeneous mixing of the EGR with the air in the relatively short distance of the mixing tube 34. In the example illustrated in FIGS. 2 and 3, the mixing element 42 is at least one helical member that is configured to induce vortices V, as shown in FIG. 4A-4C. In one example, first and second helical members 50, 52 are arranged adjacent to one another. Each of the first and second helical members provide one 180° twist between their first and second ends 54, 56. The first end 54 of the second helical member 52 is rotationally offset from the second end 56 of the first helical member 50, as best illustrated in FIGS. 3 and 4B. The offset first and second helical members 50, 52 introduce vortices V that homogeneously mix the EGR and the air within a relatively short distance.

Referring to FIGS. 5 and 6, another example mixing element 142 for another mixing tube 134 is illustrated. The mixing tube 134 may be used in place of the mixing tube 34 shown in FIG. 2. The mixing element 142 is provided by multiple tabs 58 extending from an inner surface 64 at a base 60 and tapering to an end 62. The tabs 58 may be arranged in axial columns 66 that are spaced circumferentially from one another about the inner surface 64. Although four columns of two rows are illustrated in FIG. 5, it should be understood that other numbers and configurations of the tabs 58 may be used. The tabs 58 produce vortices V, as illustrated in FIG. 6, with substantially less of a pressure loss than the mixing element 42 illustrated in FIG. 3, for example, only 25-50% of the pressure loss produced by an equivalent sized mixing tube 34.

Referring to FIG. 7, in one example, the tabs 58 are spaced distances 80, 84 approximately ½ the diameter 48 from the terminal ends of the mixing tube 134. The bases 60 of tabs 58 within a second row are spaced a distance 82 that is approximately the length of the diameter 48.

Figure 8:
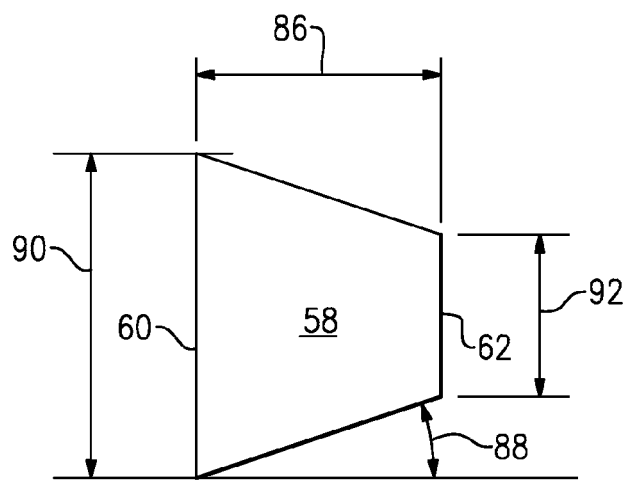
FIG. 8 is a plan view of a tab used in the mixing element illustrated in FIG. 5.
Figure 9:
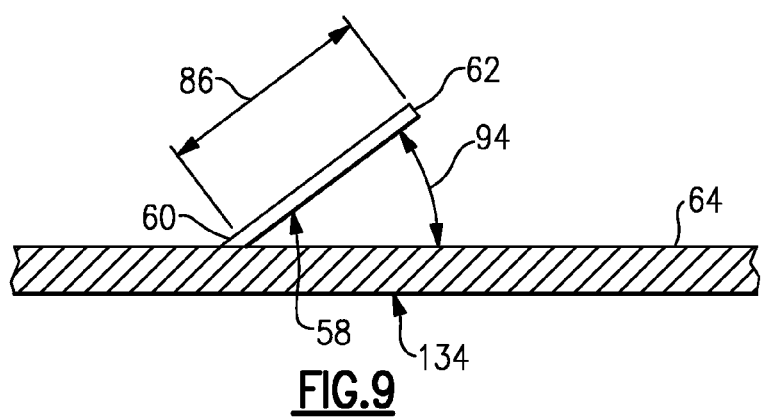
FIG. 9 is a cross-sectional view illustrating an orientation of the tab relative to a mixing tube.

Referring to FIG. 8, the base 60 has a length 90 that is approximately 1/10 to 1/8 multiplied by π multiplied by the diameter 48. The end 62 is approximately 0.75 multiplied by the length 90 of the base 60, for example. The angle 88 of the sides of the tab 58 is approximately 10°-12°. The axial length 86 of the sides is approximately 1-1.1 multiplied by the length 90 of the base 60. Referring to FIG. 9, the tabs 58 are canted at an angle 94 relative to the inner surface 64 by approximately 20°-25°. It should be understood that the dimensions and configuration of the tabs 58 may be different than shown, if desired for a given application.

Although an example embodiment has been disclosed, a worker of ordinary skill in this art would recognize that certain modifications would come within the scope of the claims. For that reason, the following claims should be studied to determine their true scope and content.

What is claimed is:

1. An exhaust gas recirculation mixer comprising:
an air supply passage having a convergent portion including a tapered portion terminating at a distal end of the convergent portion;
an exhaust gas recirculation passage within the convergent portion and including a nozzle having a terminal end substantially axially aligned with the distal end of the convergent portion;
a mixing tube downstream from the air supply passage and at least a portion of the exhaust gas recirculation passage, the mixing tube attached to the distal end of the convergent portion; and
a helical mixing element disposed in and extending axially within the mixing tube, the helical mixing element bending at least 90 degrees around a central longitudinal axis of the mixing tube.

2. The exhaust gas recirculation mixer according to claim 1, wherein the nozzle is arranged within the convergent portion, the nozzle tapering toward the mixing tube.

3. The exhaust gas recirculation mixer according to claim 2, wherein the exhaust gas recirculation passage penetrates the air supply passage upstream from the convergent portion.

4. The exhaust gas recirculation mixer according to claim 2, wherein the nozzle and the convergent portion are frustoconical and concentric with one another forming an annulus.

5. The exhaust gas recirculation mixer according to claim 1, wherein the mixing element is disposed downstream from the terminal end.

6. The exhaust gas recirculation mixer according to claim 5, wherein the mixing element is secured to the mixing tube.

7. The exhaust gas recirculation mixer according to claim 1, wherein the mixing tube includes a length and a diameter, the length less than approximately three times the diameter.

8. The exhaust gas recirculation mixer according to claim 7, further comprising a divergent portion adjoining the mixing tube opposite the air supply passage and providing a mixed gas passage.

9. An engine comprising:
at least one cylinder;
an intake manifold and an exhaust manifold fluidly connected to the cylinder;
an air supply passage having a convergent portion upstream from the intake manifold;
an exhaust gas recirculation passage within the convergent portion and in fluid communication with the exhaust manifold, the exhaust gas recirculation passage including a nozzle having a terminal end;
a mixing tube disposed downstream from the terminal end; and
a mixing element disposed within the mixing tube, the mixing element including a first helical element having a first leading edge and a second helical element having a second leading edge, the first and second helical elements bending around a central longitudinal axis of the mixing tube, the second helical element being located downstream from the first helical element and adjacent to the first helical element, the second leading edge of the second helical element being rotationally offset from the first leading edge of the first helical element.

10. The engine according to claim 9, wherein the air supply passage includes a compressor, the mixing element fluidly arranged between the compressor and the cylinder.

11. The engine according to claim 10, further comprising a turbine coupled to the compressor, the turbine disposed within a portion of the exhaust.

12. The engine according to claim 9, further comprising a divergent portion adjoining the mixing tube opposite the air supply passage and providing a mixed gas passage.

13. The engine according to claim 9, wherein the second leading edge of the second helical element is rotationally offset from the first leading edge of the first helical element by at least 90 degrees.

14. The engine according to claim 9, wherein the first and second helical elements bend at least 90 degrees around a central longitudinal axis of the mixing tube.

15. The exhaust gas recirculation mixer according to claim 1, wherein the helical mixing element bends at least 180 degrees around the central longitudinal axis of the mixing tube.

* * * * *